UNITED STATES PATENT OFFICE.

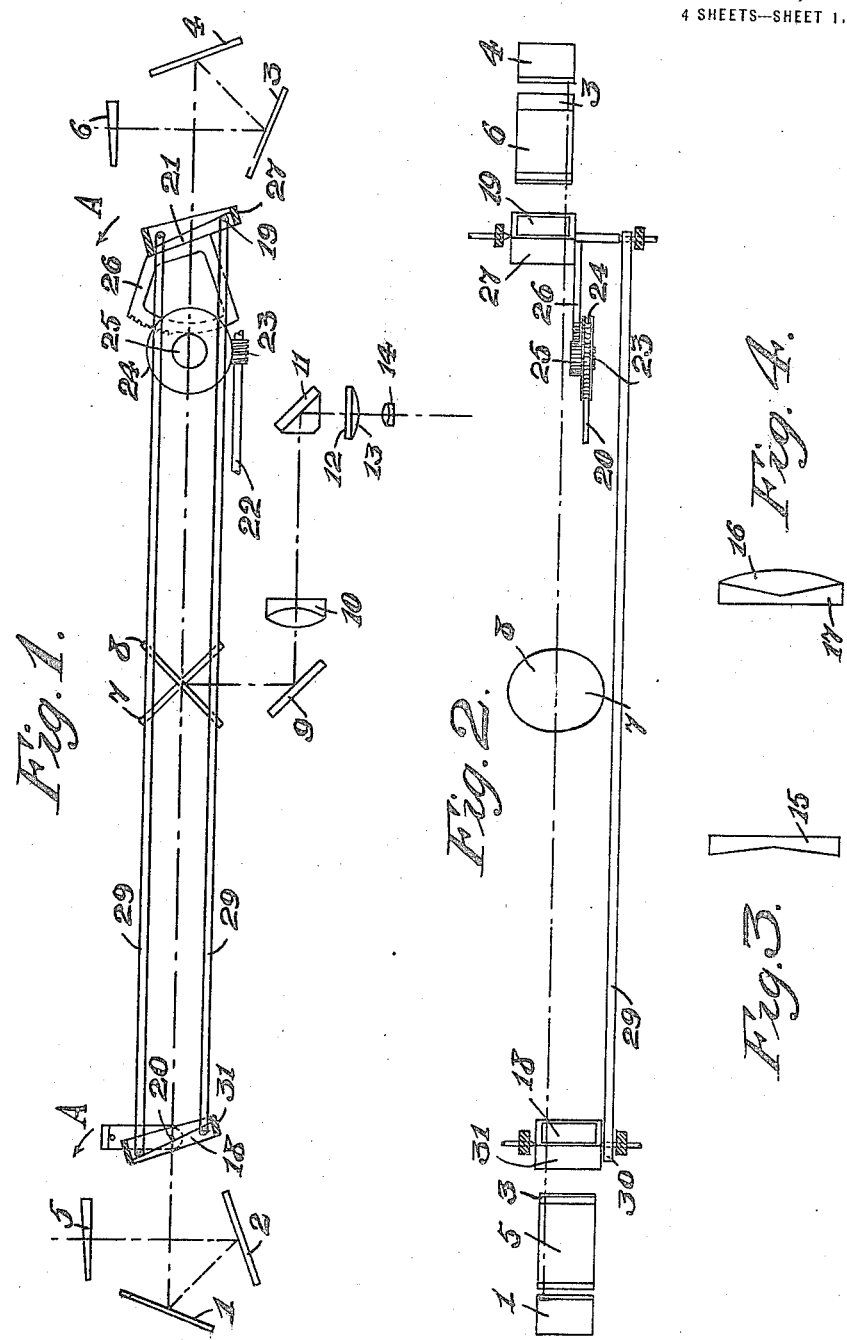

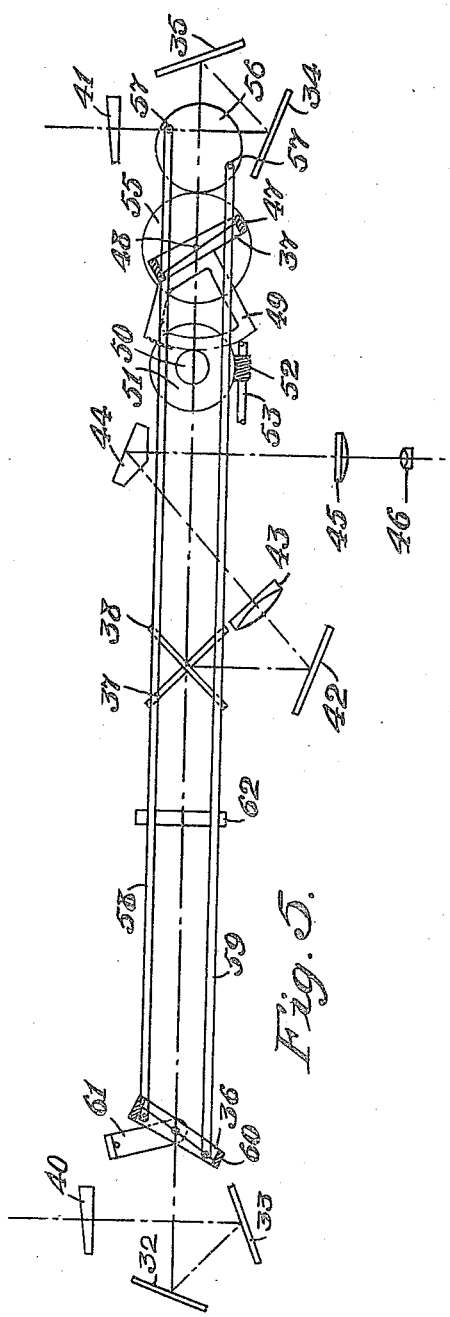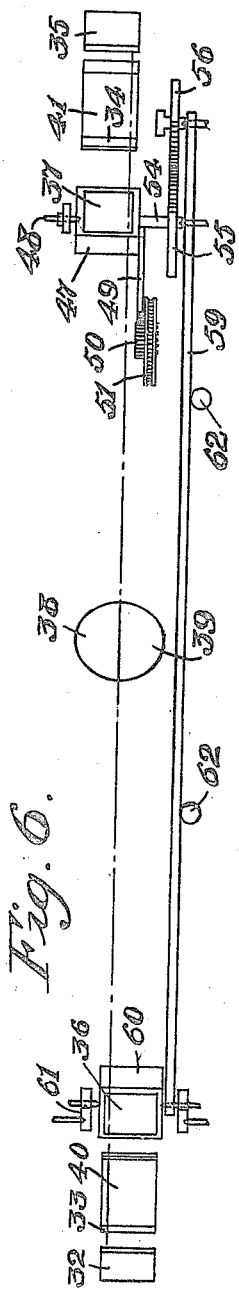

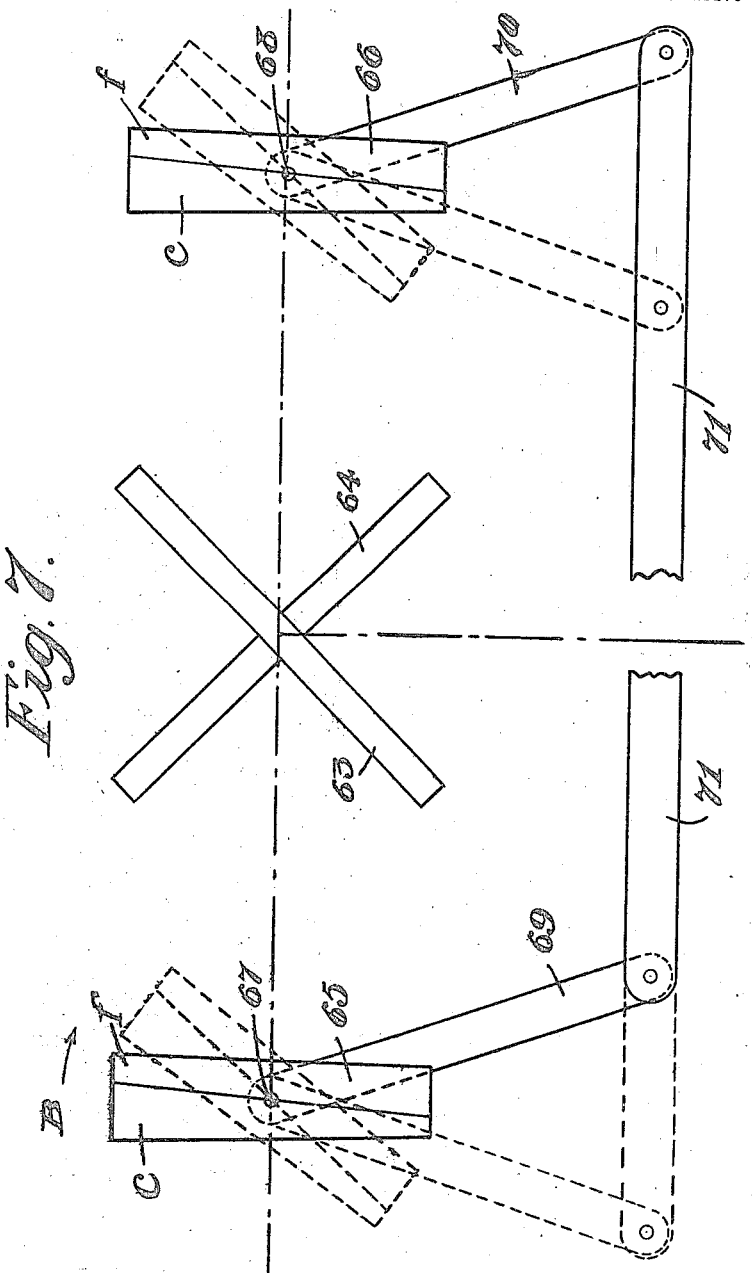

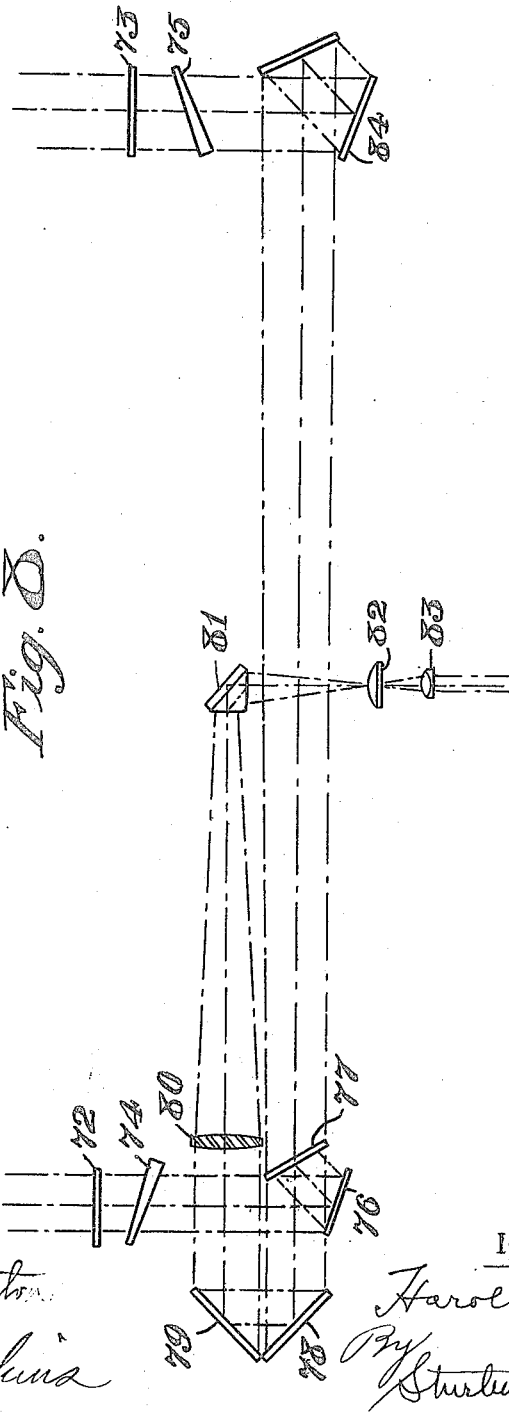

HAROLD DENNIS TAYLOR, OF YORK, ENGLAND, ASSIGNOR OF ONE-HALF TO ALFRED TAYLOR, OF YORK, ENGLAND.

RANGE-FINDING AND THE LIKE INSTRUMENT.

1,424,125.   Specification of Letters Patent.   Patented July 25, 1922.

Application filed May 28, 1918. Serial No. 237,127.

*To all whom it may concern:*

Be it known that I, HAROLD DENNIS TAYLOR, a subject of the King of Great Britain, residing at Mount Villa, York, in the county of York and Kingdom of England, have invented certain new and useful Improvements in and Relating to Range-Finding and the like Instruments, of which the following is a specification.

The present invention relates to improvements in optical instruments used as range finders and more particularly to that type of instrument where a pair of reflecting surfaces at the ends of a base of fixed length termed a "home base" reflect light upon reflecting surfaces placed preferably at the centre of the said base and thence to a telescope.

The rays of light from one of these reflecting surfaces, usually optical squares, at the end of the base has usually been deflected for optical purposes by a variety of means such as a pivoted prism, a prism sliding in the line of vision, and so forth.

Now according to the present invention light from both reflecting surfaces at the ends of the base is deflected for range finding purposes.

This is done in the preferred construction by means of a pair of pivoted achromatic prisms, linked together to move equally and simultaneously in the same or in opposite directions around vertical axes, being suitably connected to the usual indicating mechanism.

By this means the minimum deviation required of each achromatic prism is reduced to one half and each will neutralize half of the parallax observed as objects viewed become nearer to the instrument. Further the slight magnification of both images caused by the prisms, which increases as the ranges decrease, is equal for both images in contradistinction to the older arrangement where the swinging prism for range-finding was generally at a different angle to the zero adjustment prism, as for instance at very long or very short ranges, the two images were magnified more or less differently so that it became desirable to limit observations to the centre of the field. With the present arrangement the two images are subject to the same small magnifications so that if a vertical line is in coincidence across the halving line in the centre of the field it will usually also remain in coincidence up to the left or right margin of the field.

With the duplicate prism being now used for range finding purposes it is no longer possible to use it for "infinity" adjustment, as in H. D. Taylor's British patent specification No. 12735 of 1905.

For this purpose either one or both windows may be slightly prismatic in form, adapted to refract rays by say about 10 seconds of arc. Then on rotating the windows in their own planes, each window will be capable of shifting the image seen through it by 20 seconds of arc left to right and it can be fixed in the desired adjusted position.

Reference is made to the accompanying diagrammatic drawings in which:—

Figure 1 is a plan view of a range finder.
Figure 2 is a corresponding side elevation.
Figure 3 shows a female separating prism.
Figure 4 shows a modified form of separating prism.
Figure 5 is a plan view of a modification.
Figure 6 is a corresponding plan view.
Figure 7 is a further modified arrangement in plan view.
Figure 8 shows a plan of a further modification.

The optical squares may be formed of solid glass prisms or of pairs of mirrors 1, 2 and 3, 4 which are arranged in slightly displaced planes to receive light from the windows 5 and 6 and pass the rays to a pair of half reflecting mirrors 7, 8 from which the light is directed upon a whole plane mirror 9 thence through an objective 10 to a reversing elbow prism 11. The images are then projected upon and separated by a halving prism 12 before being received by field lens 13 and the eye lens 14 of the eyepiece. The halving prism may be a female one as shown at 15, Figure 3 or a compound one consisting of a male halving prism or prismatic lens 16 balsalmed into a female halving prism 17 (Fig. 4). If a four lens erecting eyepiece be used, then a male halving prism can be used. 18 and 19 are a pair of achromatic prisms pivoted to move together around vertical axes 20, 21 for range finding purposes, in the direction of the arrows A, being connected by suitable gearing and linkage, so as to move equally but in the same directions.

As the prisms are designed to be swung simultaneously in the same direction, the crown prism of one range prism and the flint prism of the other are placed nearest the eye and centre of instrument.

Moreover in all cases the swing should be so arranged that the angle $\alpha$ between the thick end of the crown prism and the central ray increases and becomes more obtuse as the prism swings round for the short ranges. At the infinity position the external surface of the crown prism should be about perpendicular to the central ray or line of light, while for the shortest range observable the angle of swing should be 40 to 41 degrees and the angle $\alpha$ should be 131° if the prisms are constructed according to the following specification.

In the case of a 9 feet base length rangefinding instrument to take ranges from infinity down to 1000 yards, the largest parallax that has to be measured is therefore .003 in circular measure or an angle of 10 mins. 19 secs. and half of this or 5 min. 9½ secs. will have to be corrected by each of the two prisms.

Suppose the crown prism is of borosilicate crown glass having refractive index for D ray $=1.5087=N_D$ and dispersive power or $$\frac{N_D - 1}{N_F - N_C} = 64.2$$

and the flint prism is of dense flint glass having refractive index for D ray $=1.6214$ and $$\frac{N_D - 1}{N_F - N_C} = 36.1.$$

Then the angle between the two surfaces of the crown prism will be 37′ 50″
and do. for the flint prism 17′ 24″

Angle between external surfaces = 20′ 26″

Angle of swing for 1000 yards range = 40¼°.

The minimum deviation given by each prism will be 8 min. 26 secs. when set square on to the line of sight. The angles for the prisms should be increased in proportion to the length of base. Thus double the base or from the example given, 18 feet, would require prisms of double the above angles, if ranges down to 1000 yards are to be measured and the same degree of swing (40¼°) maintained.

The prisms 18 and 19 are actuated by turning the spindle 22 by a milled head conveniently near the eyepiece 14. This spindle 22 terminates in a worm 23 gearing into a worm wheel 24 on the top of which is fixed pinion 25 which gears into the sector 26 attached to the cell 27 carrying the achromatic prism 19 which, with the sector, is pivoted at 21 about its middle.

The cell 27 has a pair of pins carrying parallel rods 29 linked to pins on the correspondingly extended end 30 of the cell 31 carrying the prism 18. A range drum may be connected to the spindle 22.

In the modification of Figures 5 and 6 the moving prisms are arranged to move both in the same direction.

Rays of light from a distant object are received by the mirrors 32, 33 and 34, 35 of a pair of optical squares to be refracted by compound achromatic prisms 36 and 37 on to half mirrors 38, 39 in the centre of the instrument. The windows 40, 41 of the rangefinder are preferably slightly prismatic and means may be provided to move them slightly usually by rotation for the purpose of "zero" adjustment of the range drum and for locking them in this adjusted position.

Light from the mirrors 38 and 39 are reflected by the mirror 42 arranged at an angle less than 45° so that the eyepiece can be fitted in closer to the instrument. Similarly as described with reference to Figs. 1 and 2, the mirror 42 will however reflect into an object glass 43, roof prism 44, halving prism 45 and eyepiece 46.

The prism 37 is mounted in a cell 47 pivoted at 48 in common with a sector 49 meshing with pinion 50 on worm wheel 51 gearing with worm 52 on the spindle 53 which is provided with an operating head and is connected to the range scale.

The cell 47 is extended at 54 and carries a pinion 55 gearing with a pinion 56 having pins 57 carrying the connecting rods 58, 59 which are connected to the cell 60 carrying the prism 36. The cell 60 is not pivoted directly on the frame but on a pivoted link 61. This arrangement is desirable in order to obviate very strong strains by the connecting rods 58, 59 on their end link pins which may arise under changes of temperature of the rods 58, 59 as these rods are made of a metal having a different coefficient of expansion to that forming the body of the range finder. In certain cases it may be desirable to provide roller supports 62 to prevent sagging.

Since each prism when set to position of minimum deviation deviates the central ray by 8 min. 26 secs. it is clear that if the two parallel pencils of light coming from an infinitely distant object are to focus in coincidence in the observing telescope, it will be necessary to reduce the angle between the two mirrors in each optical square to 4 min. 13 secs. less than 45°. This is very difficult to carry out with any exactitude if the optical squares are glass pentagonal prisms but quite feasible if built up of plain parallel silvered mirrors held in a metal frame as described in H. D. Taylor's British patent specification U. K. 7392 of 1910. It is also advisable to hold the two crossed half mirrors 37 and 38 in a nickel iron frame in substantially the same way and with all requisite precautions, since the invariability of the right angles between these two mirrors is just as important as the invariability of the angles between the mirrors of each optical square.

In order that there shall be the least possible amount of light lost in its passage through the range finder it is desirable that the eyepiece shall be of the simple Kellner type and to this end the converging beam of light from the objective 43 must be received and reflected off the roof prism 44 which totally reflects the light (if the surfaces are clean) into the eyepiece 46 at the same time that it erects the images. It will also be necessary to employ a female separating prism Fig. 3 or better still a compound one like Fig. 4. The primary image is thrown upon this and its use enables the pupil of the eye to be filled with light from both the upper and lower half images at the same time.

In the modification diagrammatically shown in Fig. 7 a pair of central mirrors 63, 64 receive light from a pair of swinging prisms 65, 66 pivoted at 67 and 68 respectively. Attached to the metal cells carrying the prism are the two parallel levers 69 and 70 whose free ends are coupled together by the connecting rod or tube 71, whose length pivot to pivot is the same as the length apart of the two fixed pivots 67 and 68 and is preferably made of the same metal as the body of the rangefinder between 67 and 68.

It is obvious that if 65 is caused to swing round in the direction of the arrow B then 66 will necessarily follow and keep parallel to it. This device is therefore practically self compensating as regards temperature whereas where a pair of parallel rods are used should one rod get warmer than the other then the two prisms will get out of parallel, but in the present case should the rod 71 get warmer or colder than the two connections 70, 69 then although the prisms will be thrown out of parallel, still they will move away from their normal position in opposite directions, and the two displacements of the images will be in the same direction and will therefore have no effect.

In this case where the two prisms move in the same direction the crown glass element $c$ will be on the same side, that is to say the centre elements will be crown glass $c$ in one case and flint glass $f$ in the other case.

In Fig. 8 light comes from the object on to two windows 72, 73 each preferably slightly prismatic so that by rotation in their own plane, zero corrections on the instrument may be made. The prisms 74 and 75 move in the same direction by any suitable linkage from the operating head. Light from the prism 74 is reflected by the optical square formed of parallel sheets of glass 76, 77, thence on to one half of mirrors 78 and 79 to be received in the objective 80 together with light in the other half field of view reflected by the optical square 84 on the other half of the mirrors 78 and 79. The rays of light from the objective 80 are received by a roof prism 81 and thence deflected into a halving prism 82 giving a "split" image in the eye piece 83.

I declare that what I claim is:—

1. A range finder comprising in combination a pair of prisms, an optical eye-piece receiving images from said prisms, means to move said prisms in unison in planes substantially at right angles to their own planes, means to indicate the amount of said movement, prismatic windows receiving light prior to refraction by said prisms.

2. A range finder comprising in combination a pair of compound achromatic prisms, an optical eye-piece receiving images from said prisms, means to move said prisms in unison, means to indicate the amount of said movement, prismatic windows receiving light prior to refraction by said prisms.

3. A range finder comprising in combination a pair of light refracting prisms, each comprising a crown glass section of corosilicate having a refraction index for the D ray $=1.5087=N_D$ and dispersive power or $$\frac{N_D - 1}{N_F - N_C} = 64.2,$$

the other sector being of dense flint glass having a refractive index for the D ray of 1.6214 and $$\frac{N_D - 1}{N_F - N_C} = 36.1,$$

pivots at right angles to the optic axis carrying said compound prisms, means to move said compound prisms in unison about said pivots, and means to indicate the amount of said movement.

4. A range finder comprising in combination a pair of light deflecting prisms, pivots carrying said prisms and arranged at right angles to the optic axis, an optical eye-piece receiving images from said prisms, parallel links interconnecting said prisms, means to displace said parallel links to move said prisms about their axes, and means to indicate the amount of said movement.

5. A range finder comprising in combination a pair of light deflecting prisms, pivots carrying said prisms and arranged at right angles to the optic axis, an optical eye-piece receiving images from said prisms, parallel links interconnecting said prisms, means to displace said parallel links to move said prisms about their axes, a disc connected to said parallel links, worm teeth on said disc, a worm wheel gearing with said worm teeth, and a range dial spindle carrying said worm wheel.

6. A range finder comprising in combination a pair of optical squares receiving light in the same direction from a distant object and placed at a fixed distance apart, a pair of prisms, an optical eye-piece receiving images from said prisms, means to move said prisms in unison, means to indicate the amount of said movement, prismatic windows receiving light prior to refraction by said prism.

7. A range finder comprising in combination a pair of light deflecting prisms, pivots carrying said prisms and arranged at right angles to the optic axis, a centrally disposed optical eye-piece receiving images from said prisms, parallel links interconnecting said prisms, means to displace said parallel links to move said prisms about their axes, and means to indicate the amount of said movement.

8. A range finder comprising in combination a pair of light receiving and deflecting surfaces, a pair of half-mirrors arranged at right angles to one another, receiving light from said surfaces, each occupying half the field of view, an optical eye-piece receiving images from said mirrors, means to move said light deflecting surfaces in unison about an axis in their own plane, and means to indicate the amount of said movement.

9. A range finder comprising in combination a pair of light receiving and deflecting surfaces, a pair of half-mirrors arranged at right angles to one another, receiving light from said surfaces, each occupying half the field of view, an optical eye-piece receiving images from said mirrors, means to move said light deflecting surfaces in unison about an axis in their own plane, means to displace the light images projected in each half field of view to obtain a split image, and means to indicate the amount of movement of said light deflecting surfaces.

10. A range finder comprising in combination a pair of light receiving and deflecting surfaces a pair of half-mirrors at right angles to one another receiving light from said surfaces each occupying half the field of view, a roof prism, an optical eyepiece receiving images from said roof prism, means to move the light deflecting surfaces in unison and means to indicate the amount of said movement.

11. A range finder comprising in combination a pair of light receiving and deflecting surfaces a pair of half-mirrors at right angles to one another receiving light from said surface, each occupying half the field of view, an image erecting roof prism an optical eyepiece displaced across the optical axis between said light reflecting and receiving surfaces, a mirror inclined at less than 45° for projecting light into said eyepiece, means to move the light deflecting surfaces in unison and means to indicate the amount of said movement.

12. A range finder comprising in combination a pair of light receiving and deflecting surfaces, a pair of half mirrors at right angles to one another receiving light from said surfaces each occupying half the field of view and within the said light deflecting surfaces, an optical eye-piece receiving images from said half mirrors, means to move said light deflecting means in unison about an axis in their own plane, and means to indicate the amount of said movement.

In witness whereof, I have hereunto signed my name this 24th day of April 1918, in the presence of two subscribing witnesses.

HAROLD DENNIS TAYLOR.

Witnesses:
GEORGE WILLIAM CURRY,
DOROTHY ADELAIDE HAZELL.